US008380258B2

(12) United States Patent
Kim et al.

(10) Patent No.: US 8,380,258 B2
(45) Date of Patent: Feb. 19, 2013

(54) MOBILE TERMINAL

(75) Inventors: Hyun-Jun Kim, Seoul (KR); Jung-Ha Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 644 days.

(21) Appl. No.: 12/611,867

(22) Filed: Nov. 3, 2009

(65) Prior Publication Data

US 2010/0112949 A1     May 6, 2010

(30) Foreign Application Priority Data

Nov. 4, 2008   (KR) .................. 10-2008-0109115

(51) Int. Cl.
*H04B 1/034* (2006.01)
*H04B 1/08* (2006.01)
*H04M 1/00* (2006.01)

(52) U.S. Cl. ............ 455/575.1; 455/550.1; 455/128; 455/347

(58) Field of Classification Search ........... 455/41.2, 455/41.3, 66.1, 550.1, 556.1, 575.1, 575.6, 455/90.3, 128, 344, 347
See application file for complete search history.

(56) References Cited

U.S. PATENT DOCUMENTS

| 5,564,096 A | 10/1996 | Hama et al. |
| 5,612,675 A * | 3/1997 | Jennings et al. ........... 340/573.1 |
| 5,963,181 A * | 10/1999 | Abe ............................ 343/895 |
| 6,217,339 B1 * | 4/2001 | Tsubata ....................... 439/38 |
| 6,825,751 B1 * | 11/2004 | Kita et al. ................... 340/5.61 |
| 6,853,605 B2 * | 2/2005 | Fujisawa et al. .............. 368/10 |
| 7,804,412 B2 * | 9/2010 | Derrick et al. ............ 340/573.1 |
| 7,907,542 B2 * | 3/2011 | Smith .......................... 370/252 |
| 2003/0114203 A1 | 6/2003 | Lee |
| 2005/0054321 A1 * | 3/2005 | Casagrande et al. .......... 455/351 |
| 2006/0268528 A1 | 11/2006 | Zadesky et al. |
| 2007/0111753 A1 * | 5/2007 | Vock et al. ................ 455/552.1 |
| 2008/0164934 A1 | 7/2008 | Hankey et al. |
| 2009/0143117 A1 * | 6/2009 | Shin et al. .................. 455/575.6 |
| 2009/0156255 A1 * | 6/2009 | Shin et al. ...................... 455/558 |
| 2010/0158077 A1 * | 6/2010 | Mahany ....................... 375/132 |
| 2011/0002106 A1 * | 1/2011 | Bentley et al. ................ 361/752 |

FOREIGN PATENT DOCUMENTS

| WO | 2004008721 | 1/2004 |
| WO | 2008060058 | 5/2008 |

* cited by examiner

*Primary Examiner* — Andrew Wendell
(74) *Attorney, Agent, or Firm* — Lee, Hong, Degerman, Kang & Waimey

(57) ABSTRACT

According to the present invention, there is disclosed a mobile terminal, comprising a case made of a metal that forms an appearance of the mobile terminal, a printed circuit board (PCB) having a wireless communication module that is mounted within the case, a connecting terminal having a conductive material that is electrically connected to the PCB and mounted on the case, and an insulation sealing member disposed between the case and the connecting terminal to insulate the connecting terminal from the case as well as to seal a space between the case and the connecting terminal.

19 Claims, 9 Drawing Sheets

MOBILE TERMINAL

RELATED APPLICATION

The present disclosure relates to subject matter contained in priority Korean Application No. 10-2008-0109115, filed on Nov. 4, 2008, which is herein expressly incorporated by reference in its entirety.

BACKGROUND OF THE INVENTION

1. Field of the Invention

The present invention relates to a watch-type mobile terminal formed with a metal case.

2. Description of the Related Art

Mobile terminals can be easily carried and have one or more of functions such as supporting voice and video telephony calls, inputting and/or outputting information, storing data and the like.

As it becomes multifunctional, furthermore, the mobile terminal can be allowed to capture still images or moving images, play music or video files, play games, receive broadcast and the like, so as to be implemented as an integrated multimedia player.

Various new attempts have been made for the multimedia devices by hardware or software in order to implement such complicated functions. For example, a user interface environment is provided in order for users to easily and conveniently retrieve or select functions.

Also, many users have their mobile terminals to express their own personalities, and accordingly, various designs are required for the portable terminal.

In general, mobile terminals are formed at a size that can be held by a user's hand, and the user typically carries a mobile terminal by holding it or putting it into his or her pocket, bag, or the like. However, when a phone call or text message is received by the mobile terminal in a state that the mobile terminal is located in a bag, a pocket, or the like, the user is frequently unable to recognize it.

Taking the circumstances into consideration, an auxiliary device configured for performing a short-range radio communication with a mobile terminal to notify the reception of a phone call or text message to the user may be applicable. The auxiliary device may be implemented in the form of an accessory for the mobile terminal, and may be also implemented in the form of a watch that can be worn on the user's wrist.

SUMMARY OF THE INVENTION

In case where the appearance of a watch-type terminal is formed of a metal, it is an object of the present invention to provide a structure capable of implementing an insulation function of a case and connection terminals as well as a waterproof function of the case using a simple structure.

Furthermore, for the connection terminals having a plurality of functions, it is another object of the present invention to maintain the function of connection terminals while reducing the number of connection terminals, thereby reducing a size of the mobile terminal.

Furthermore, for a limited inner space thereof, it is still another object of the present invention to disclose a new contact structure of the connection terminals and a printed circuit board.

In order to accomplish the foregoing objective, a mobile terminal includes a case made of a metal that forms an appearance of the mobile terminal, a printed circuit board (PCB) having a wireless communication module that is mounted within the case, a connecting terminal having a conductive material that is electrically connected to the PCB and mounted on the case, and an insulation sealing member configured to insulate the connecting terminal from the case as well as to seal a space between the case and the connecting terminal.

The connecting terminal may include a head portion formed to make contact with a terminal of an external device, and a fixing portion that is extended from the head portion and fixed to a fixing hole formed at the case.

The insulation sealing member may be inserted into the fixing hole, and formed to surround the head portion and the fixing portion.

The connecting terminal may be disposed at a terminal mounting portion formed to be recessed on the case, and the terminal mounting portion may be formed at a corner portion of the case.

A supporting frame for supporting the PCB may be mounted within the case, and a through hole through which the elastic contact unit penetrates may be formed at a corner region of the supporting frame. Furthermore, the supporting frame may further include a component mounting portion positioned at the remaining region thereof other than the through hole.

On the other hand, according to the present invention, there is disclosed a mobile terminal including a main body having a wireless communication module, and a terminal assembly provided in the main body to connect to an external device, wherein the terminal assembly includes a first and a second connecting terminals connected to a ground and a first data line, respectively, a third connecting terminal configured to selectively connect to either one of a second data line and a battery charge line, and a switch configured to selectively connect the third connecting terminal to either one of the second data line and the battery charge line.

The first data line may be either one of a data transmitting line and a data receiving line, and the second data line may be the other one of the data transmitting line and the data receiving line.

The first, the second, and the third terminals may operate as transmitting and/or receiving terminals in the data transmitting and receiving mode, and the first and the third connecting terminals operate as charging terminals in the battery charge mode.

On the other hand, according to the present invention, there is disclosed a mobile terminal including a case having a wireless communication module that is provided with a connecting terminal on the outside thereof, a PCB mounted within the case, the PCB being disposed to be apart from the connecting terminal by a predetermined distance, and a elastic contact unit extended from the PCB to the connecting terminal for elastically contacting the PCB with the connecting terminal.

The object and configuration of a portable terminal according to the present invention as described above will be more clearly understood through a detailed description according to preferred embodiments of the invention based upon the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a mobile terminal according to the present invention will be described in more detail with reference to the accompanying drawings.

A suffix "module" or "unit" used for constituent elements disclosed in the following description is merely intended for easy description of the specification, and the suffix itself does not give any special meaning or function. Therefore, it should be noted that the suffix "module" or "unit" may be interchangeably used each other.

Figure 1:
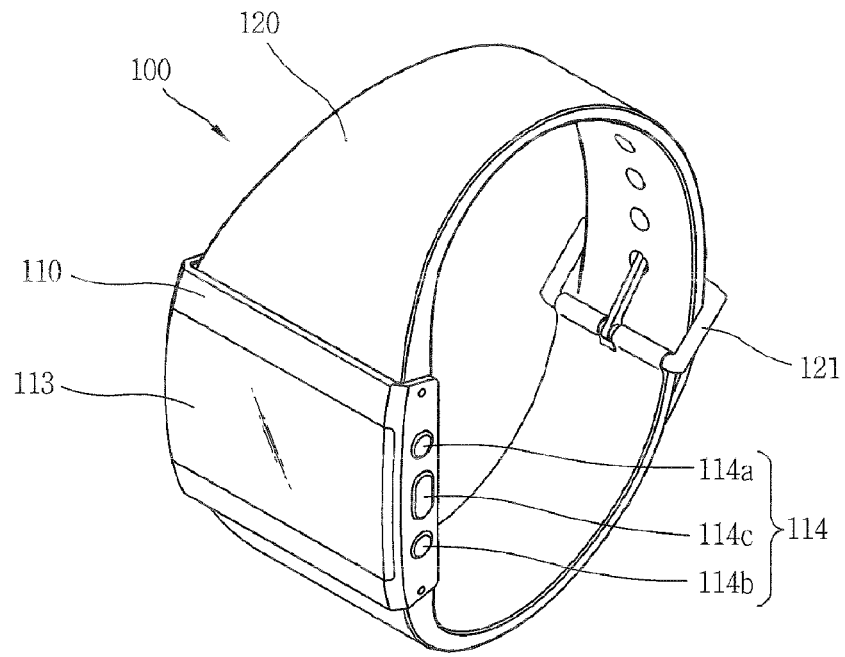
FIG. 1 is a front perspective view illustrating a mobile terminal according to an embodiment of the present invention.

FIG. 1 is a front perspective view illustrating a mobile terminal according to an embodiment of the present invention.

As illustrated in FIG. 1, a mobile terminal 100 includes a terminal main body 110, and a band 120 connected to both ends of the terminal main body 110.

Furthermore, a wireless communication module for performing a wireless communication with an external device is provided in the terminal main body 110.

Furthermore, a case (casing, housing, cover, etc.) forming an appearance of the terminal main body 110 is formed of a metal such as stainless steel (STS), titanium (Ti), or the like. Various electronic components are built in a space formed within the case.

Furthermore, a display unit 113 and a manipulation unit 114 are disposed at an outside of the terminal main body 110.

The display unit 113 is configured to display time information (for example, information on time). The display unit 113 may include a liquid crystal display (LCD) module, an organic light emitting diode (OLED) module, and the like.

The manipulation unit 114 receives a command for controlling the operation of a mobile terminal according to an example of the present invention. Any method may be employed for the manipulation unit 114 if it is manipulated in a tactile manner. For example, the manipulation unit 114 may be implemented with a push-key or touch-key capable of receiving a command or information by a user's push or touch manipulation, or may be also implemented with a wheel or jog method for rotating a key or a method for manipulating a joystick, or the like.

The manipulation unit 114 according to this embodiment is implemented with a first, a second, and a third push keys 114a, 114b, 114c. From a functional viewpoint, the first and the second push keys 114a, 114b are configured to input a volume control, a movement between the menus, and the like, and the third push key 114c may operate as an "OK Key" or "Enter Key."

The band 120 is formed to be worn on a user's wrist or arm. The band 120 may be provided with a fastener 151 for attaching the terminal main body 110 to the user's wrist or arm. The fastener 151 may be implemented by a hook structure for performing a buckle, or snap-fit operation, and may be formed of an elastic section or material. According to this embodiment, there is disclosed an example in which the fastener 151 is formed in a buckle type.

Figure 2:
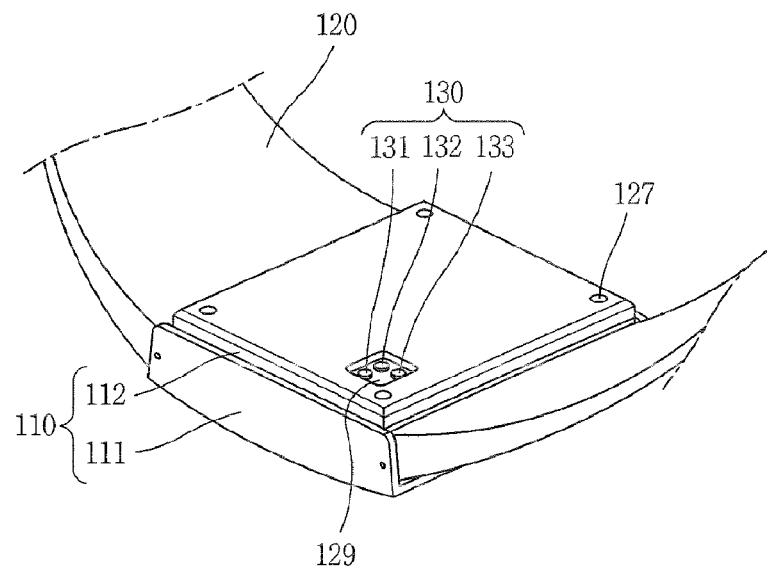
FIG. 2 is a rear perspective view illustrating a mobile terminal according to an embodiment of the present invention.

FIG. 2 is a rear perspective view illustrating a mobile terminal according to an embodiment of the present invention.

Referring to FIG. 2, the case forming the terminal main body 110 includes a front case 111 and a rear case 112.

The front case 111 is provided with an inner space for mounting electronic components, and the rear case 112 is configured to open or close the inner space. For this purpose, the rear case 112 may be coupled with the front case 111 by a coupling component such as a screw 127.

A plurality of connecting terminals 130 for electrically connecting with an external device may be disposed at the rear case 112. The connecting terminals 130 according to an embodiment of the present invention may include a first through a third connecting terminals 131, 132, 133. The connecting terminals 130 are connected to an external charging device or a data transmitting and/or receiving device to supply power to the terminal main body 110 or transmit and/or receive data to and/or from the terminal main body 110.

The connecting terminals 130 may be disposed at a terminal mounting portion 129 formed on the rear case 112. The terminal mounting portion 129 may have a predetermined area, and formed to be recessed from a surface of the rear case 112 by a predetermined depth. The terminal mounting portion 129 may be formed at a corner region of the rear case 112.

Figure 3:
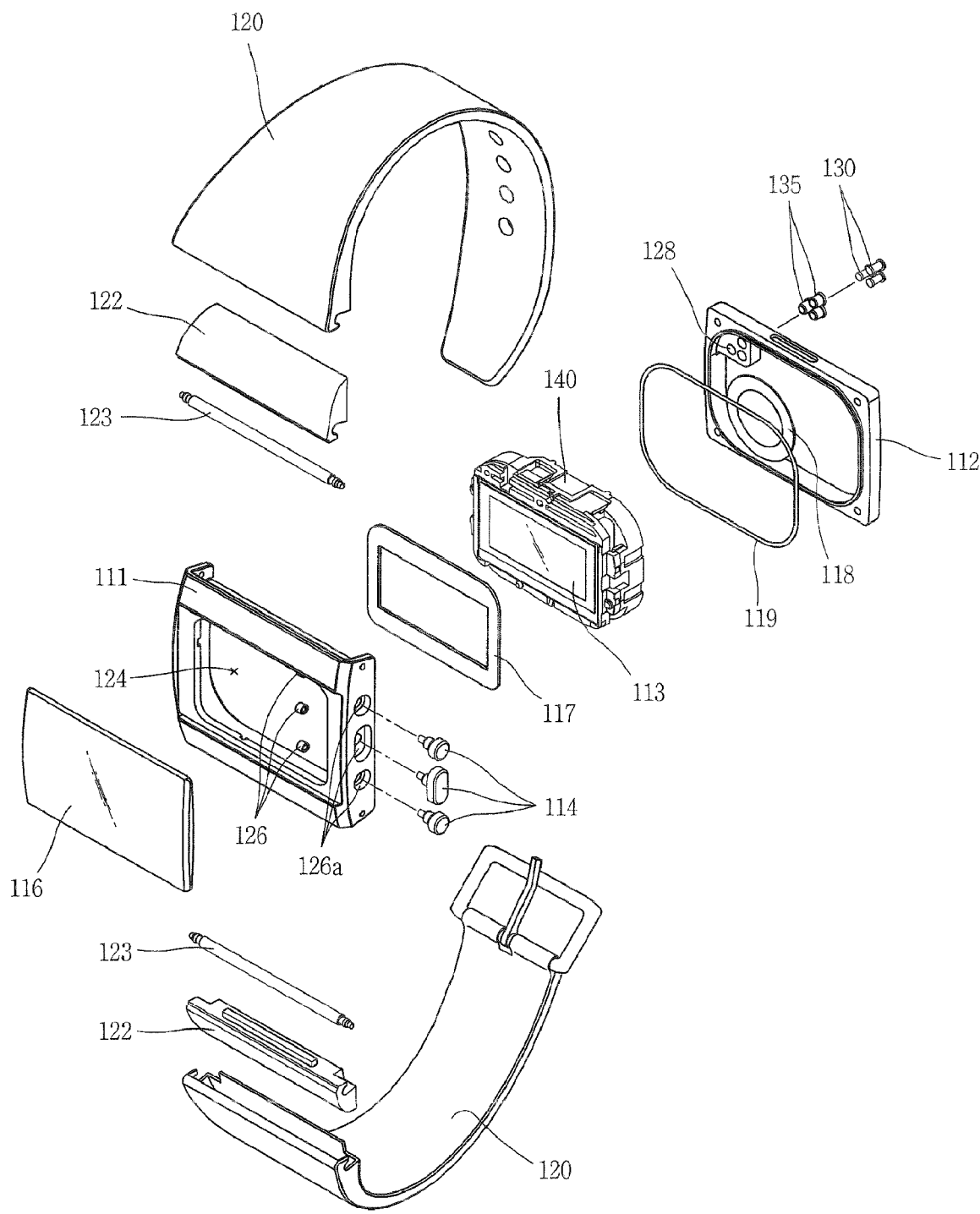
FIG. 3 is an exploded perspective view illustrating a mobile terminal according to an embodiment of the present invention.

FIG. 3 is an exploded perspective view illustrating a mobile terminal according to an embodiment of the present invention.

Referring to FIG. 3, a connector 122 and a hinge 123 for rotatably connecting the band 120 to front case 111 are mounted between the front case 111 and the band 120. A pair of connectors 122 and hinges 123 may be mounted at both ends of the front case 111. An end of the connector 122 is fixed to the band 120, and the other end thereof is rotatably connected to the hinge 123. In addition, the hinge 123 is rotatably connected to the front case 111. The connector 122 and the hinge 123 may be formed of a metal such as stainless steel.

Furthermore, a window 116 having a transparent material is mounted on a front surface of the front case 111. The window 116 may be formed with a transparent plastic material, or reinforced glass material. The window 116 may be adhered to the front case 111 by an adhesive agent. The window 116 may further include a touch sensing member for allowing an input by a touch method (including a direct contact or proximity touch). Such a touch sensing member may be formed of a transparent sheet including a transparent electrode pattern.

A gasket 126 for sealing an assembly gap formed between the manipulation unit and the front case may be mounted between the manipulation unit 114 and the front case 111. The gasket 126 is inserted into an assembly hole 126 mounted by the manipulation unit 114, and may be formed with a rubber or silicon material. The gasket 126 prevents water from infiltrating into the terminal main body 110 through the assembly hole, thereby providing a waterproof function to the mobile terminal.

Furthermore, a mounting hole 124 for mounting various electronic components is formed on a rear surface of the front case 111. The electronic components mounted within the terminal main body 110 are assembled in the case through the mounting hole 124, and the rear case 112 is coupled to the front case 111 to open or close the mounting hole 124.

A supporting frame 140 mounted with the display unit 113 is mounted in a space formed between the front case 111 and the rear case 112. The supporting frame 140 functions to accommodate or support various electronic components (for example, a PCB, a display unit). Furthermore, the supporting frame 140 has a structure to be assembled in the front case 111 in a state that various electronic components are built in, thereby providing efficiency and convenience during the assembly operation.

A shock-absorbing pad 117 is mounted between the display unit 113 and the front case 111. The shock-absorbing pad 117 is formed with an elastically transformed material to absorb a shock applied to the front case 111 or the window 116. The shock-absorbing pad 117 is formed to cover an outer wall of an output region of the display unit 113.

A coupling rib 118 is formed in a corresponding form to the mounting hole 124 on a surface of the rear case 112 facing the front case 111. A gasket 119 for preventing water or alien substances from leaking into the assembly gap thereof is mounted on an outer surface of the coupling rib 118.

The connecting terminals 130 are fixed in a state that are inserted into a fixing hole 128 formed at the rear case 112. An insulation sealing member 135 for sealing between the fixing hole 128 and the connecting terminal 130 is provided between the connecting terminal 130 and an inner wall surface of the fixing hole 128. The insulation sealing member 135 seals an inside of the terminal main body 110 as well as insulates between the connecting terminal 130 and the rear case 112. The insulation sealing member 135 may be formed with a material such as plastic, rubber, silicon, and the like.

A speaker 125 for outputting various alerting sounds of the mobile terminal or reproduced sounds of multimedia may be provided on an inner surface of the rear case 112. A piezoelectric-type speaker may be applicable to the speaker 125 to implement the mobile terminal having a slimmer thickness.

Figure 4:
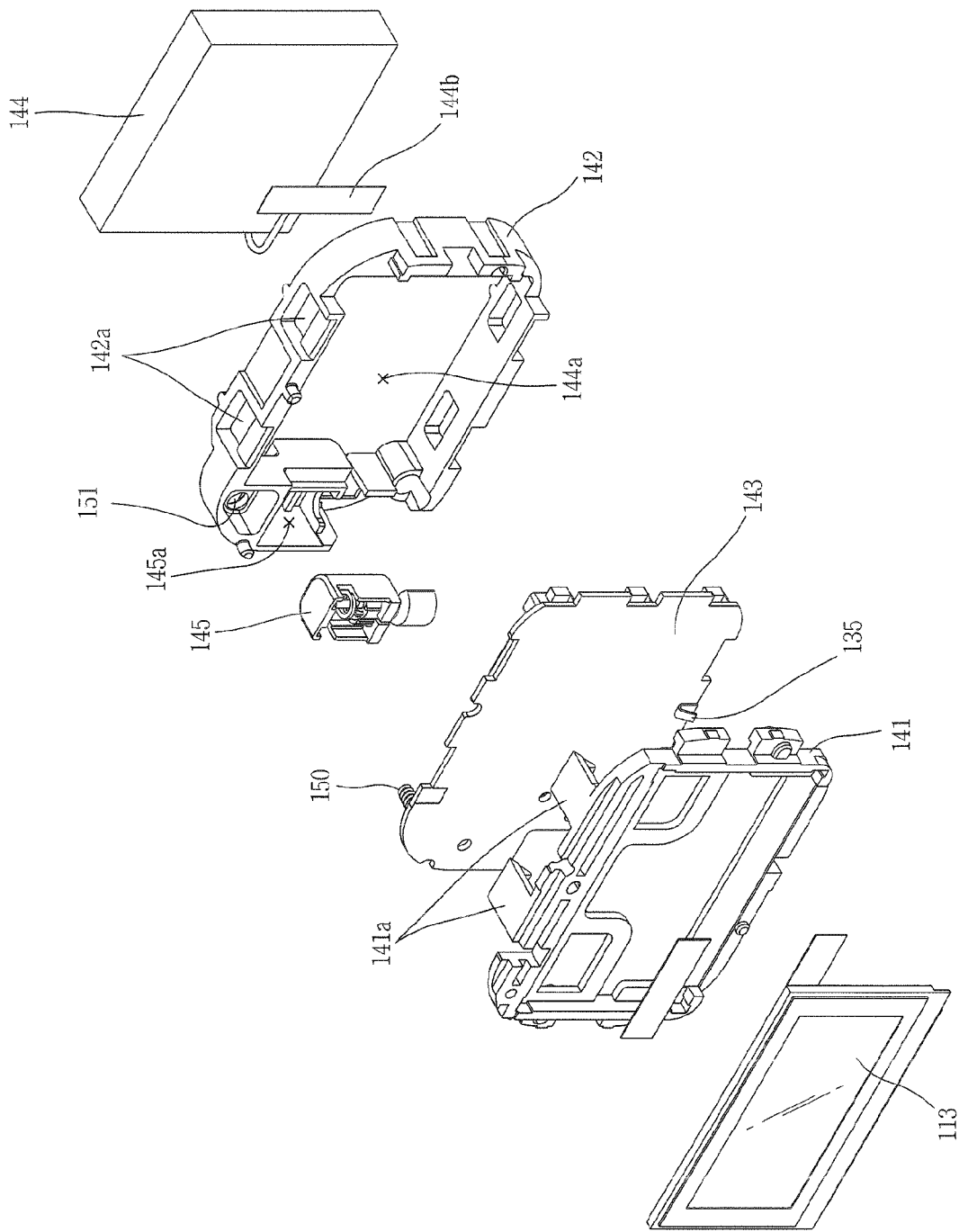
FIG. 4 is an exploded perspective view illustrating a supporting frame of FIG. 3.
Figure 5:
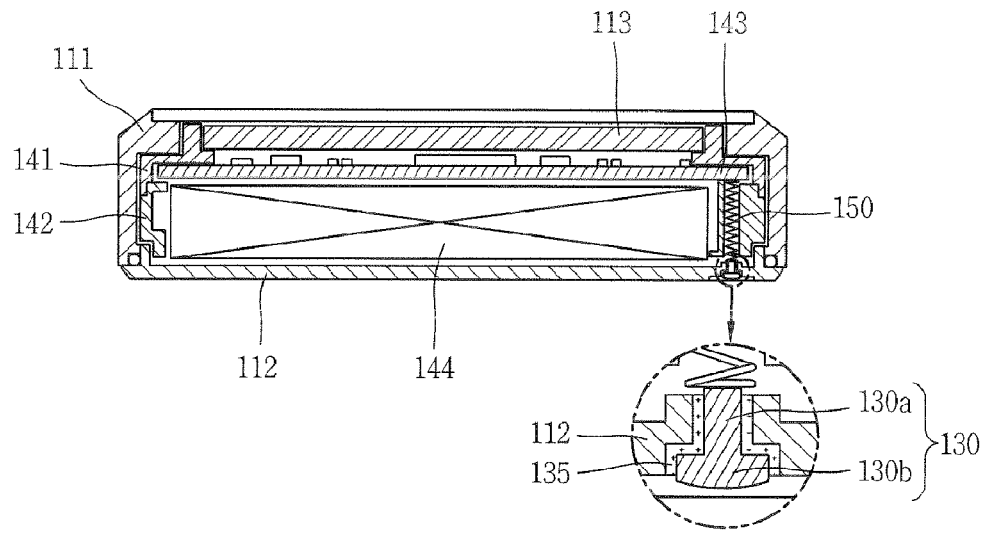
FIG. 5 is a cross-sectional view illustrating a terminal main body of FIG. 1.

FIG. 4 is an exploded perspective view illustrating a supporting frame of FIG. 3, and FIG. 5 is a cross-sectional view illustrating a terminal main body.

As illustrated in FIG. 4, the supporting frame 140 includes a first frame 141 and a second frame 142 coupled to the first frame 141.

The first frame 141 and the second frame 142 are coupled to each other to form an inner space in the middle thereof. A fastening hook 141a is formed at the first frame 141, and a fastening groove 142a for fastening the fastening hook 141a is formed at the second frame 142.

A display module 113 is mounted on a front surface of the first frame 141. Furthermore, the first frame 141 and the second frame 142 support a PCB 143 positioned therebetween.

The PCB 143 is provided with a wireless communication module for processing radio signals and a processor for controlling input and output components. The wireless communication module may include a Bluetooth module for performing a short-range wireless transmission with an external terminal.

A battery mounting portion 144a for mounting a battery 144 is formed at the second frame 142. The battery mounting portion 144a is formed to occupy most area of the second frame 142. The battery 144 is connected to the PCB 143 through an adhesive connecting member 144b.

A vibrator 145 for generating vibration is mounted on the second frame 142. The vibrator 145 is mounted on a vibrator mounting portion 145a formed at a side of the battery mounting portion 144a.

Referring to FIG. 5, the connecting terminal 130 is provided with a head portion 130a disposed to be exposed to an outside of the rear case 112, and a fixing portion 130b to be extended from the head portion 130a. The head portion 130a is contacted with a connecting terminal of an external device, and the fixing portion 130b is inserted and fixed into the fixing hole 128.

The insulation sealing member 135 is inserted into the fixing hole 128, and formed to surround a circumference of the fixing portion 130b. For this purpose, the insulation sealing member 135 may be formed in a corresponding form to the shape of the connecting terminal 130.

On the other hand, an elastic contact unit 150 for elastically contacting the connecting terminal 130 with the PCB 143 is disposed between the connecting terminal 130 and the PCB 143.

As illustrated in FIGS. 4 and 5, a space separated by a predetermined distance in which the connecting terminals 130 are disposed is formed between a surface of the front case 111 and the PCB 143, and mounting components such as a battery 144 and a vibrator 145 are mounted in this space. In other words, the PCB 143 is positioned to be apart from the connecting terminals 130 by a predetermined distance to arrange the mounting components.

The elastic contact unit 150 is formed of a conductive material such as a metal to electrically connect the connecting terminals 130 to the PCB 143. According to this embodiment, the elastic contact unit 150 is implemented in the form of a spring having a predetermined length, and in this case, an end of the spring is attached to the PCB 143 to be connected with a connecting point of the PCB 143. Furthermore, the other end of the spring is elastically contacted with the connecting terminal 130, which is disposed at the rear case 112.

The connecting point of the PCB 143 may be disposed to correspond to a position of the connecting terminal on the PCB 143. In other words, the connecting point of the PCB 143 is formed at a downward (or upward) position from the connecting terminal 130 in a vertical direction, that is, a spring length direction.

Furthermore, a through hole 151 through which the elastic contact unit 150 penetrates is formed at the second frame 142. The through hole 151 is disposed at a corner region of the second frame 142, and a component mounting portion (for example, a battery mounting portion 144a, or a vibrator mounting portion 145a) is formed at the remaining region thereof. It is because the battery 144 and the vibrator 145 are arranged at proper places to minimize the size of the terminal main body 110, and the region for disposing the connecting terminals 130 is arranged at a corner region of the terminal main body 110.

The elastic contact unit 150 is assembled to penetrate through the through hole 151 of the second frame 142 in a state to which the PCB 143 is attached. When the first frame 141 and the second frame 142 are combined to complete an assembly of the supporting frame 140, the elastic contact unit 150 is exposed to an outside of the second frame 142 to make contact with the connecting terminal 130.

Figure 6:
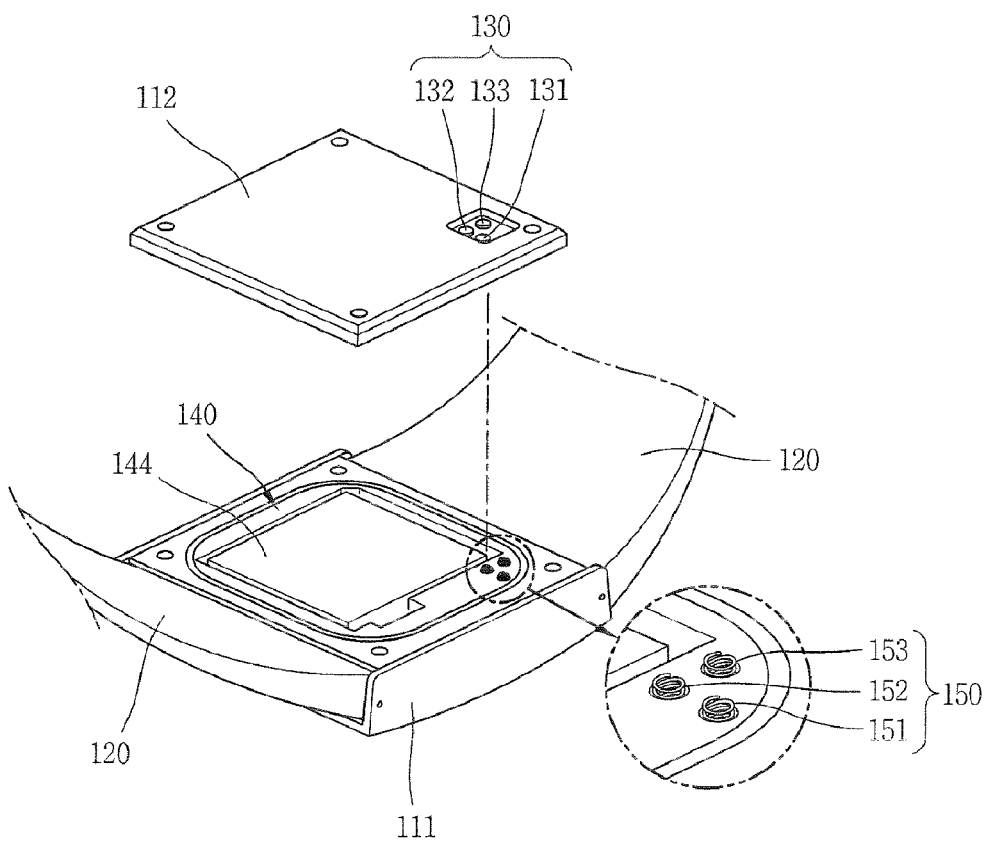
FIG. 6 is an exploded perspective rear view of a mobile terminal illustrating a configuration of connecting terminals.
Figure 7:
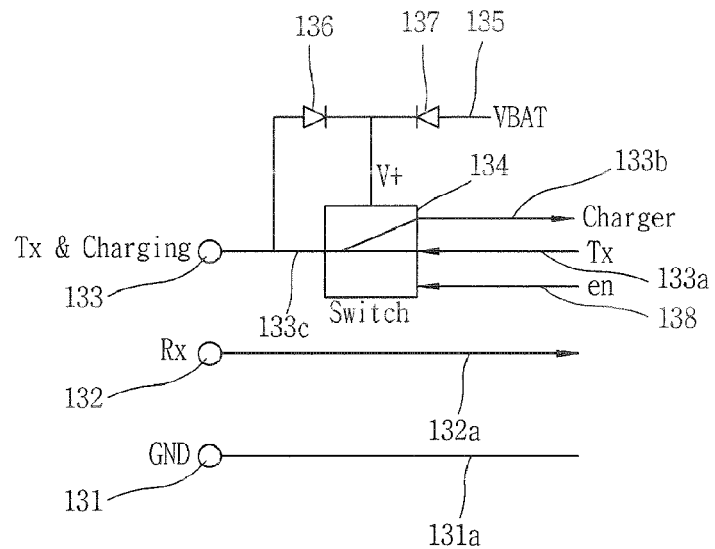
FIG. 7 is a conceptual diagram illustrating a circuit configuration of connecting terminals.

FIG. 6 is an exploded perspective rear view of a mobile terminal illustrating a configuration of connecting terminals, and FIG. 7 is a conceptual diagram illustrating a circuit configuration of connecting terminals.

It is illustrated in FIG. 6 that the supporting frame 140 is mounted on the mounting hole 124 (refer to FIG. 3) of the front case 111. The elastic contact unit 150 is in a state that is exposed to an outside of the supporting frame 140.

When the rear case 112 is coupled with the front case 111, the connecting terminals 130 becomes in contact with the elastic contact unit 150. Such a configuration allows to electrically connect the PCB 143 and the connecting terminals 130, which are positioned apart from each other, as well as to enhance the convenience of an assembly through a simple structure. Furthermore, an electrical connection between the PCB 143 and the connecting terminals 130 may be stably maintained by the elasticity of the elastic contact unit 150.

Referring to FIGS. 6 and 7, the connecting terminals 130, that is, a terminal assembly 130 may include a first connecting terminal 131 connected to a ground and a second connecting terminal 132 connected to a first data line 132a, a third connecting terminal 133 configured to selectively connect to either one of a second data line 133a and a battery charge line 133b, and a switch 134 configured to selectively connect the third connecting terminal 133 to either one of the second data line 133a and the battery charge line 133b.

Furthermore, the elastic contact unit 150 may include a first through a third elastic contact units 151, 152, 153 having corresponding positions and quantity to a first through a third connecting terminals 131, 132, 133.

The first data line 132a may be either one of a data transmitting line and a data receiving line for exchanging data with an external device, and the second data line 133a may be the other one of the data transmitting line and the data receiving line. According to this embodiment, a case is taken as an example in which the first data line 132a is used as a data receiving line 132a, and the second data line 133a is used as a data transmitting line 133a.

The switch 134 is connected to the third connecting terminal 133, and also connected to the data receiving and transmitting lines 133a, 133b, thereby switching an electrical connection of the third connecting terminal 133.

Figure 11:
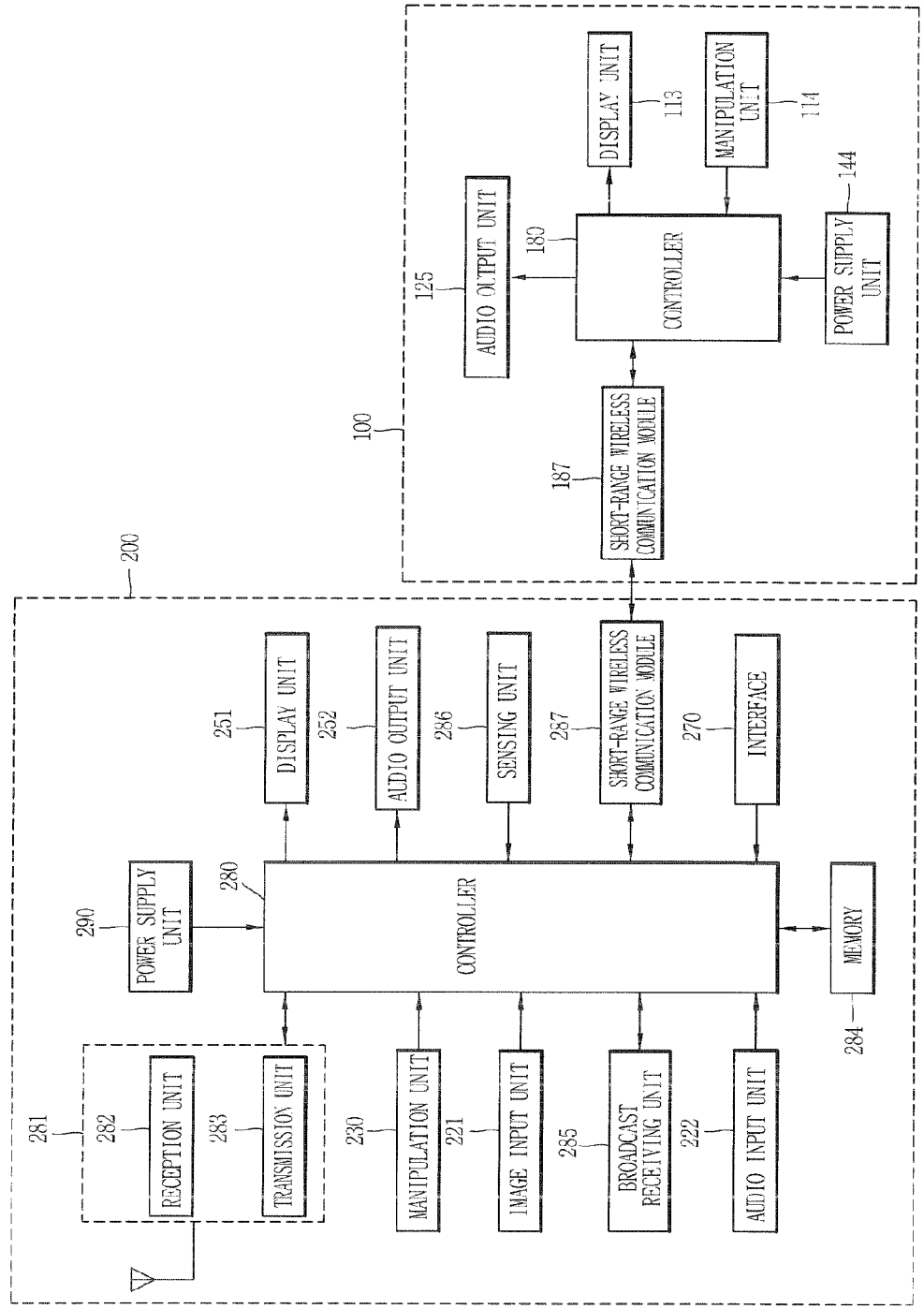
FIG. 11 is a block diagram illustrating a main terminal and a watch-type terminal according to the present invention.

The switch 134 is connected to a controller 180, thereby functioning by a signal applied from the controller 180 (refer to FIG. 11). The switch 134 is connected to a controller through a control line 138, and power is supplied from a power supply line 135 connected to the battery 144.

The controller 180 applies a signal to the switch 134 when switching between a data transmitting and receiving mode (for example, data transmission and reception for upgrading mobile terminal software) and a charge mode to operate the switch. The power supply line 135 is also connected to the third connecting terminal 133. Furthermore, the power supply line 135 may be provided with a first diode 136 for preventing a current of the battery 144 from flowing into the third connecting terminal 133 in the data transmission mode, and a second diode 137 for preventing a current for charging the power supply line from flowing in the charge mode.

An example of the operating state of the switch 134 will be described as follows.

If the mobile terminal is in a standby mode, phone call mode, or the like, then the controller 180 applies a first signal (low signal) to the switch 134 through the control line 138. As a result, a line connected to the third connecting terminal 133 will be connected to the battery charge line 133b.

If the mobile terminal is switched to a data transmitting and receiving mode, then the controller 180 applies a second signal (high signal) to the switch 134. As a result, the switch 134 connects the line connected to the third connecting terminal 133 to the data transmitting line 133b. In this case, the first through the third connecting terminals 131, 132, 133 function as data transmitting and/or receiving terminals such as a ground terminal, a data receiving terminal, and a data transmitting terminal.

If the mobile terminal is switched to the charge mode for charging a battery, then the controller 180 applies a first signal (low signal) to the switch 134. The switch 134 connects a line connected to the third connecting terminal 133 with the battery charge line 133b. In this case, the first connecting terminal 131 and the third connecting terminal 133 functions as charging terminals such as a ground terminal (− terminal) and an anode terminal (+ terminal).

In such a way, the data transmitting terminal and the charging terminal (+ terminal) can be commonly used, thereby reducing the number of connecting terminals. If the data transmitting terminal and the charging terminal are separately arranged, then the number of connecting terminals will be four. In this embodiment, one terminal is commonly used as the data transmitting terminal or charging terminal, thereby reducing the number of connecting terminals to three.

The number of terminals may greatly affect on the size of a mobile terminal. The size of the mounting hole 124 should be limited to a degree that the terminal main body 110, specifically, the front case 111, can have a rigidity greater than a predetermined value.

If four connecting terminals are used, the space occupied by the connecting terminals will be increased accordingly. In order to secure a rigidity greater than a predetermined value, the size of the mounting hole 124 cannot be increased more than the specified size thereof, and the size of the terminal main body 110 should be increased as much as that of the increased arrangement space.

According to this embodiment, three connecting terminals are arranged as close as possible to an outer line of the mounting hole 124, thereby minimizing the size of the terminal main body 110 as well as securing the rigidity of the terminal main body 110. Therefore, this structure can be said to be a very effective structure in minimizing the size of a terminal.

Figure 8:
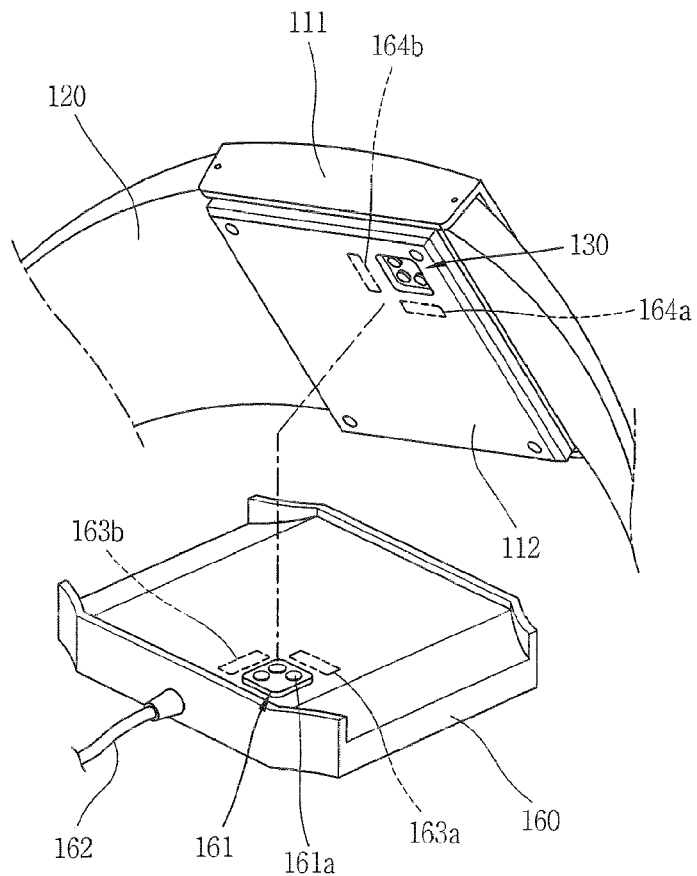
FIG. 8 is a perspective view illustrating that a mobile terminal according to the present invention is connected to an external device.

FIG. 8 is a perspective view illustrating that a mobile terminal according to the present invention is connected to an external device.

According to this embodiment, a mounting stand 160 for charging the battery 144 as an external device is taken as an example.

Any structure can be used for the mounting stand 160 provided that it is a structure for mounting a mobile terminal. The mounting stand 160 according to this embodiment has a structure on which a mobile terminal can be mounted.

A terminal portion 161 for connecting to the connecting terminals 130 of the mobile terminal is provided on an upper surface of the mounting stand 160. The terminal portion 161 is formed to be protruded by corresponding to the terminal mounting portion 129 having a recessed shape, and has a corresponding shape to the terminal mounting portion 129. The terminal portion 161 is configured to be inserted into the terminal mounting portion 129 when mounting a mobile terminal.

The connecting terminals having corresponding sizes and quantity to the connecting terminals 130 of a mobile terminal are arranged on an upper surface of the terminal mounting portion 129. The connecting terminals of both sides are contacted with each other when mounting the mobile terminal, thereby performing a charging operation of the mobile terminal.

Magnets for easily guiding the mounting of a mobile terminal may be additionally arranged on the rear case 112 and the mounting stand 160. The magnets 164a, 164b having a polarity may be arranged at an inner surface of the rear case 112, and the magnets 163a, 163b having the other polarity may be arranged on the mounting stand 160. These magnets may be arranged on a main surface of the terminal mounting portion 129 and the terminal portion 161, and accordingly a magnetic force (gravitational force) is provided to the mobile terminal when mounting the mobile terminal, thereby guiding the mounting of the mobile terminal.

Figure 9:
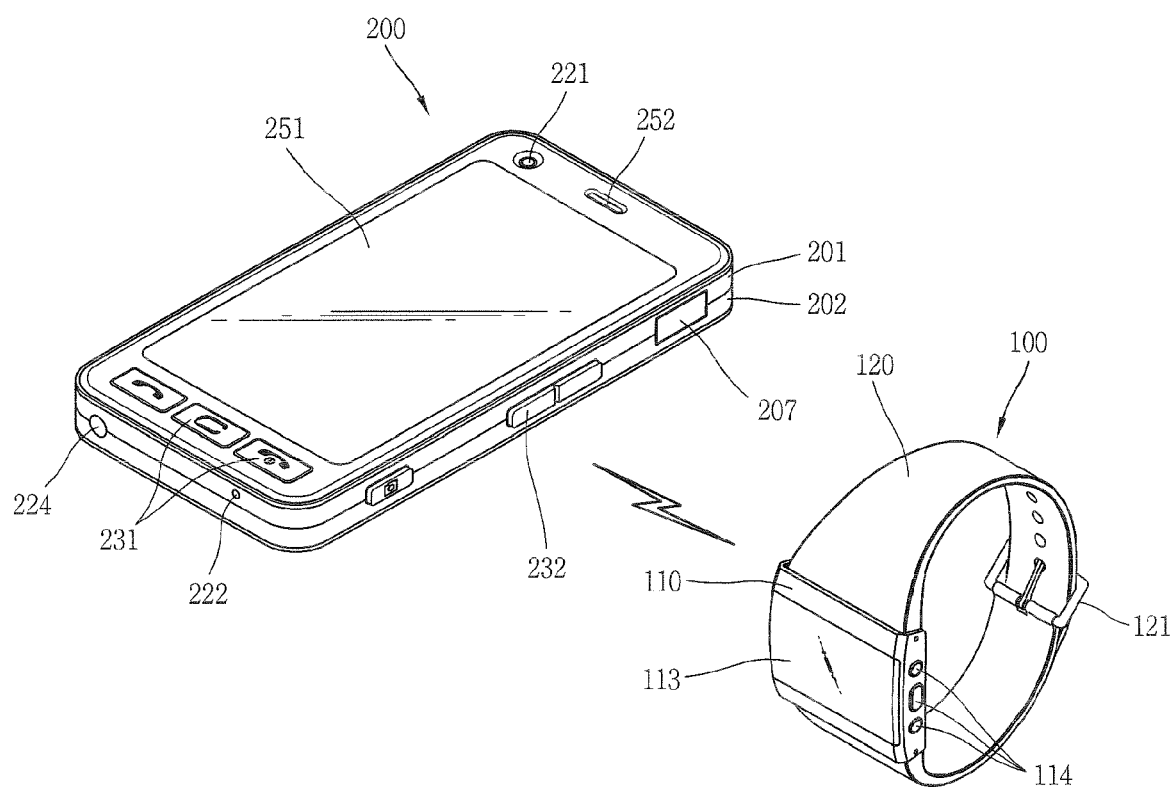
FIG. 9 is a perspective view illustrating an operating state of a mobile terminal according to an embodiment of the present invention.
Figure 10A:
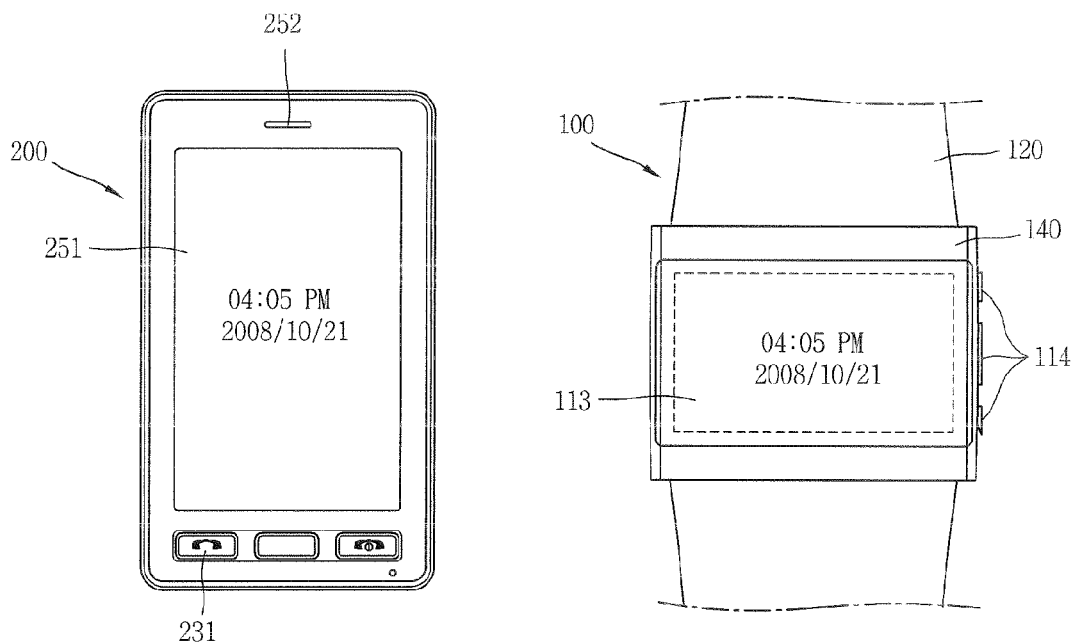
FIGS. 10A through 10C are plan views illustrating a main terminal and a watch-type terminal.
Figure 10B:
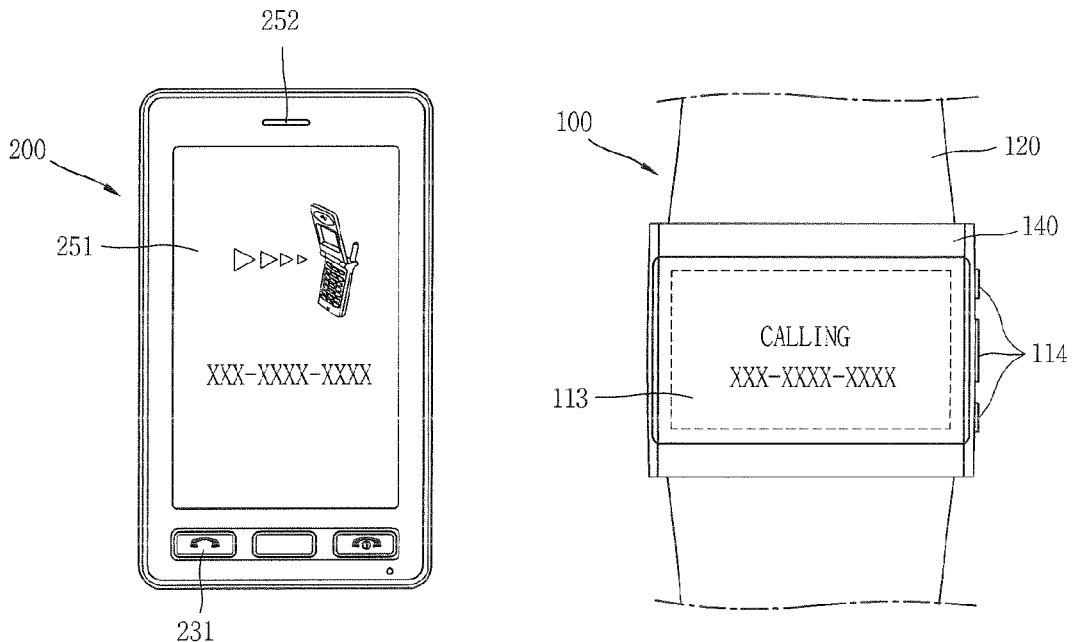
Figure 10C:
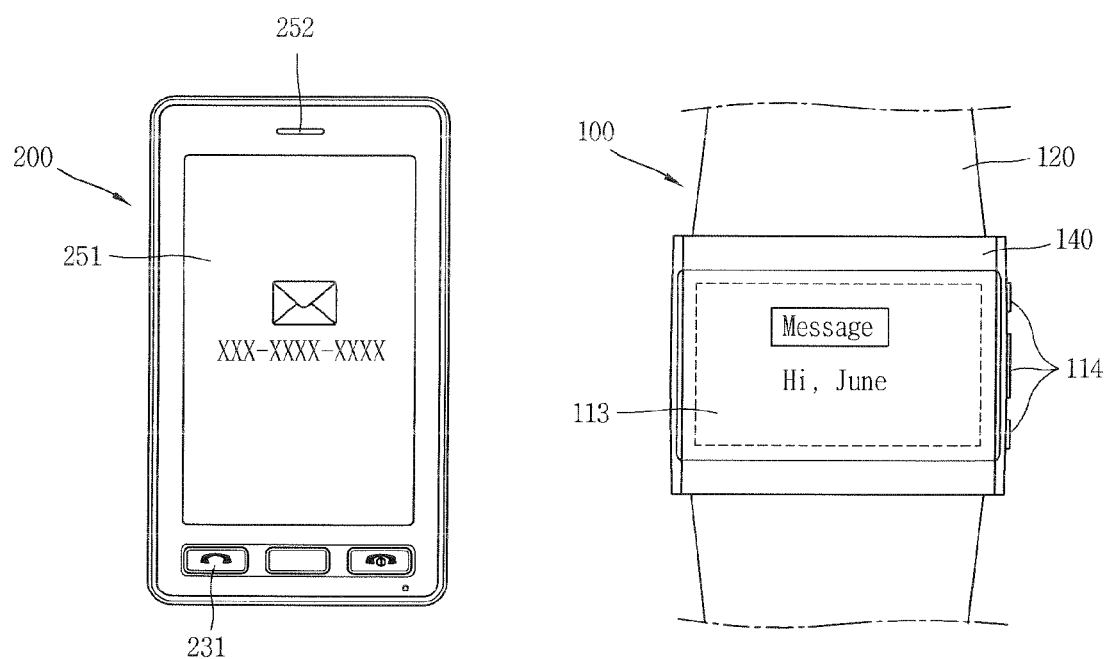

FIG. 9 is a perspective view of a main terminal and a watch-type terminal illustrating an operating state of a mobile terminal according to an embodiment of the present invention, and FIGS. 10A through 10C are plan views illustrating a main terminal and a watch-type terminal.

The mobile terminal 100 as described above may be used as an auxiliary device or accessory located at a short distance from a main terminal 200 as illustrated in FIG. 9. In this case, short-range wireless communication modules for performing a short-range communication are mounted in both the mobile terminal 100 and main terminal 200 according to the present invention. Here, the mobile terminal 100 is set to operate at the Bluetooth bandwidth of 2400-2483.5 MHz using an output power of several tens of milliwatts. In the following description, those terminals are referred to as a watch-type mobile terminal and a main mobile terminal, respectively.

The main terminal 100 is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal, and the case may be divided into a front case 201 and a rear case 202. At least one middle case may be additionally disposed between the front case 201 and the rear case 202.

At the terminal body, there may be arranged a display unit 251, an audio output unit 252, a camera 221, a user input unit 231, 232 for inputting a control command, a microphone 222, an interface 270 for functioning to communicate with an external device connected to the main terminal 100.

FIG. 10A illustrates a case when the main terminal 200 is in a standby mode. In this case, the display unit 251 of the main terminal 200 may display time and date information, and the like.

When the main terminal is in a standby mode, the display unit 113 of a watch-type terminal 100 also displays time and date information. In this case, the watch-type terminal 100 is worn on a user's wrist to perform a function similar to that of a typical watch.

FIG. 10B illustrates a case when a phone call is received by the main terminal 200. The display unit 251 of the main terminal 200 may display an image notifying the reception of a call and the caller's information (phone number, name), and the like. Furthermore, an alerting sound notifying the reception of a call may be outputted through a speaker 125.

When the main terminal 200 is located in a bag or pocket and the user is unable to easily recognize the reception of a call, the watch-type terminal 100 may acknowledge information on the reception of a call to the user.

In this case, the user may control the main terminal 200 by using the manipulation unit 114. For example, when the user cannot receive a phone call, the user may manipulate the manipulation unit 114 to suspend the reception of a call by the main terminal 200.

FIG. 10C illustrates a case when a text message is received by the main terminal 200. When a text message is received by the main terminal 200, the display unit 251 of the main terminal 200 may display an image notifying the reception of a text message and the caller's information (phone number, name), and the like.

At this time, the content of text message may be outputted in the form of a text on the display unit 113. If the content of text message exceeds a displayed area of the display unit 113, then the user may manipulate the manipulation unit 114, thereby outputting non-displayed information to the display unit 113. If the display unit 113 is implemented in the form of a touch screen, the user may write or edit a text message using the display unit 113.

FIG. 11 is a block diagram illustrating a main terminal and a watch-type terminal according to the present invention.

Referring to FIG. 11, a main terminal 200 according to an embodiment of the present invention includes a wireless communication module 281, a manipulation unit 230, an image input unit 221, an audio input unit 222, a display unit 251, an audio output unit 252, a sensing unit 286, an interface unit 270, a broadcast receiving module 285, a memory 284, a power supply unit 290, a short-range wireless communication module 287, and a controller 280.

The controller 280 typically controls the overall operations of the main terminal 200. For example, the controller 280 performs the control and processing associated with telephony calls, data communications, video calls, and the like.

The wireless communication module 281 transmits and/or receives radio signals to and/or from a wireless communication base station through an antenna. For example, the wireless communication module 281 performs a transmission and reception function of audio data, text data, video date, and control data, and for this purpose, it includes a transmission unit 283 for modulating and transmitting signals to be transmitted, and a reception unit 282 for demodulating received signals.

The manipulation unit 230 is configured as illustrated in FIG. 9 and provides key input data, which is inputted for controlling the operation of a terminal by the user, to the controller 280. The manipulation unit 230 is configured with a dome switch, a touch pad (e.g., static pressure/capacitance), a jog wheel, a jog switch, and the like.

The image input unit 221 processes image frames of still pictures or video obtained by image sensors in a video call mode or a capturing mode. The processed image frames may be converted into image data displayable on the display unit 251 and then displayed on a display unit 251.

The image frames processed by the image input unit 221 may be stored in the memory 284 or transmitted to the outside thereof via the wireless communication unit 281 by a control of the controller 280.

The audio input unit 222 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the wireless communication module 281 in case of the phone call mode. In case of the recording mode, the processed audio data is outputted to be stored in the memory 284.

The audio input unit 222 may include various noise removing algorithms to remove noise generated in the course of receiving the external audio signal.

The display unit 251 may output information processed in the mobile terminal. For example, when the mobile terminal is operating in a phone call mode, the display unit 251 will provide a User Interface (UI) or a Graphic User Interface (GUI) which includes information associated with the call. As another example, if the mobile terminal is in a video call mode or a capturing mode, the display unit 251 may additionally or alternatively display images captured and/or received, UI, or GUI. If the display unit 251 is configured to have a touch screen, it is used as an input device in addition to the output device.

The audio output unit 252 may convert audio data received from the wireless communication module 281 or stored in the memory 284 and output the converted data in a call signal reception mode, a phone call mode, a recording mode, a voice recognition mode, a broadcast reception mode, and the like, by a control of the controller 280.

Also, the audio output unit 252 may provide audible outputs related to a particular function (e.g., a call signal reception sound, a message reception sound, etc.) performed by the mobile terminal. The audio output unit 252 may include a speaker, a receiver, buzzer, or the like.

The sensing unit 286 detects a current status of the mobile terminal such as an open/close state of the mobile terminal, a location of the mobile terminal, presence or absence of user contact with the mobile terminal, etc., and generates a sense signal for controlling the operation of the mobile terminal. For example, if the mobile terminal is a slide-type phone, the sensing unit 286 senses that the slide phone is closed or opened, and outputs the sensed result to control the operation of the terminal. In addition, the sensing unit 286 can perform a sensing function as to whether or not the power supply unit 290 supplies power or whether or not the interface unit 270 is coupled with an external device.

The interface 270 may serve as an interface with at least one external device connected with the mobile terminal. For example, the external devices may include a wired/wireless headset, an external power charger, a wired/wireless data port, a card socket (e.g., for receiving a memory card, a Subscriber Identity Module/User Identity Module (SIM/UIM) card, etc.), and the like. The interface 270 may be used to receive inputs (e.g., data, information, power, etc.) from an external device and transfer the received inputs to one or more elements within the mobile terminal, or may be used to transfer data from the mobile terminal to another external device.

The memory 284 may store programs or the like used for the processing and controlling performed by the controller 280, or may temporarily store inputted/outputted data (e.g., a phonebook, messages, still images, video, etc.).

Also, the memory 284 stores a program that controls the operations of the mobile terminal according to the present invention.

The memory 284 may include at least one type of storage medium including a hard disk type, a card-type memory (e.g., SD or XD memory, etc.), a flash memory, a Random Access Memory (RAM), a Read-Only Memory (ROM), and the like.

The broadcast receiving module 285 may receive a broadcast signal transmitted through a satellite or terrestrial means, convert the same into a broadcast data format that can be outputted to the audio output unit 252, the display unit 251, and output the converted data to the controller 280. In addition, the broadcast receiving module 285 may receive supplementary data (e.g., Electronic Program Guide (EPG), a channel list, etc.) associated to a broadcast. The broadcast data and supplementary data converted by the broadcast receiving module 285 may be stored in the memory 284.

The power supply unit 290 is provided with internal or external power and supply power required for operations of the elements under the control of the controller 280.

The short-range wireless communication module 287 transmits and/or receives radio signals to and/or from the short-range wireless communication module 187 of the watch-type terminal 100. The controller 280 may be configured to control the watch-type terminal 100 using those modules.

On the other hand, a watch-type terminal 100 according to an embodiment of the present invention may include a display unit 113, an audio output unit 125, a manipulation unit 114, a power supply unit 144, a short-range wireless communication module 187, and a controller 180.

The controller 180 controls the overall operations of the watch-type terminal 100 as well as the operation of a switch 134 as described above. In other words, the controller 180 applies a signal for operating the switch 134 when switching between the data transmitting and receiving mode and the battery charge mode.

The display unit 113, the audio output unit 125, the manipulation unit 114, and the power supply unit 144 may be implemented similarly to those configurations of the main terminal 200 as described above.

The short-range wireless communication module 187 transmits and/or receives radio signals for performing a short-range wireless communication to and/or from the short-range wireless communication module 287 of the main terminal 200. The controller 180 may control the operation of the main terminal 200 using those signals.

As described above, according to the present invention, an insulation sealing member is provided between a case made of a metal and a connecting member, thereby implementing an insulation function of the connecting terminals and case as well as a waterproof function of the case.

Furthermore, according to the present invention, a switch for selectively connecting the connecting terminal to any one of a plurality of lines is provided, thereby reducing the number of connecting terminals.

Furthermore, according to the present invention, an elastic contact unit is provided between the connecting terminal and a printed circuit board, thereby having an advantage of enhancing the degree of freedom of the component arrangement within the case as well as stably maintaining an electrical connection between the connecting terminal and the printed circuit board.

The mobile terminal as described above is not limited to the configurations and methods of the foregoing embodiments, but all or part of each embodiment may be selectively combined with each other so as to implement various modifications of the embodiments.

What is claimed is:

1. A mobile terminal comprising:
a front case and a rear case that form an appearance of the mobile terminal, the rear case composed of a metal and detachably coupled to the front case;
a printed circuit board (PCB) mounted within the front case and comprising a wireless communication module;
a battery located between the PCB and the rear case;
a plurality of connecting terminals mounted in the rear case, composed of a conductive material, and configured to electrically connect to the PCB;
an elastic contact unit that extends from the PCB to the plurality of connecting terminals, is located along a side of the battery, and is configured to connect the PCB to the plurality of connecting terminals; and an insulation sealing member configured to insulate the plurality of connecting terminals from the rear case, located between the rear case and the plurality of connecting terminals, and configured to seal a space between the rear case and the plurality of connecting terminals.

2. The mobile terminal of claim 1, wherein each of the plurality of connecting terminals comprises:

a head portion formed to make contact with an external device; and a fixing portion that extends from the head portion and is fixed to a fixing hole formed in the rear case.

3. The mobile terminal of claim 2, wherein the insulation sealing member is inserted into the fixing hole and formed to surround the head portion and the fixing portion.

4. The mobile terminal of claim 1, further comprising a terminal mounting portion recessed in the rear case, wherein the plurality of connecting terminals are located in the terminal mounting portion.

5. The mobile terminal of claim 4, wherein the terminal mounting portion is formed at a corner portion of the rear case.

6. The mobile terminal of claim 1, wherein the PCB is located apart from the plurality of connecting terminals by a predetermined distance.

7. The mobile terminal of claim 6, further comprising an electronic component having a predetermined size and mounted in a space between the PCB and the plurality of connecting terminals.

8. The mobile terminal of claim 6, wherein:

the PCB further comprises a connecting point that is formed at a vertically downward position relative to the plurality of connecting terminals; and the elastic contact unit is a spring that is attached to the connecting point.

9. The mobile terminal of claim 6, further comprising a supporting frame that is mounted within the front case and configured to support the PCB.

10. The mobile terminal of claim 9, further comprising a through hole formed at a corner region of the supporting frame, the through hole penetrating the elastic contact unit.

11. The mobile terminal of claim 10, further comprising a component mounting portion that is formed on a region of the supporting frame other than the corner region where the through hole is formed.

12. The mobile terminal of claim 11, wherein the component mounting portion comprises at least a battery mounting portion or a vibrator mounting portion.

13. The mobile terminal of claim 1, further comprising a band connected at two end regions of the front case and configured to be worn on a user's wrist.

14. The mobile terminal of claim 13, wherein the wireless communication module comprises:

a short-range wireless communication module for performing short-range communication with a main terminal; and a display for visually displaying information received from the main terminal.

15. The mobile terminal of claim 14, wherein the display is configured to display time information in a standby mode.

16. The mobile terminal, of claim 1, wherein the plurality of connecting terminals comprise:

a first connecting terminal connected to ground;

a second connecting terminal connected to a first data line;

a third connecting terminal; and a switch configured to selectively connect the third connecting terminal to either a second data line or a battery charge line.

17. The mobile terminal of claim 16, wherein either the first data line is a data transmitting line and the second data line is a data receiving line or the first data line is the data receiving line and the second data line is the data transmitting line.

18. The mobile terminal of claim 17, further comprising:

a controller connected to the switch and configured to control the switch to switch between a data transmitting and receiving mode and a battery charge mode.

19. The mobile terminal of claim 18, wherein:

the first, second, and third connecting terminals operate as at least transmitting or receiving terminals in the data transmitting and receiving mode; and the first and third connecting terminals operate as charging terminals in the battery charge mode.

* * * * *